US007275055B2

(12) United States Patent
Barsness et al.

(10) Patent No.: US 7,275,055 B2
(45) Date of Patent: Sep. 25, 2007

(54) METHOD AND SYSTEM FOR MANAGING AGGREGATION DATA STRUCTURES

(75) Inventors: Eric L. Barsness, Pine Island, MN (US); Daniel E. Beuch, Rochester, MN (US); Randy W. Ruhlow, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 10/787,632

(22) Filed: Feb. 26, 2004

(65) Prior Publication Data

US 2005/0192988 A1    Sep. 1, 2005

(51) Int. Cl.
  *G06F 7/00* (2006.01)
  *G06F 17/30* (2006.01)
  *G06F 17/00* (2006.01)
(52) U.S. Cl. ............................ 707/3; 707/100; 707/102
(58) Field of Classification Search .................... 707/3, 707/100, 102
  See application file for complete search history.

(56) References Cited

U.S. PATENT DOCUMENTS

| 6,366,905 B1* | 4/2002 | Netz ............................. 707/3 |
| 6,374,234 B1* | 4/2002 | Netz ............................. 707/2 |
| 6,438,537 B1* | 8/2002 | Netz et al. ..................... 707/3 |
| 6,456,999 B1* | 9/2002 | Netz ............................. 707/2 |
| 2005/0071320 A1* | 3/2005 | Chkodrov et al. ............. 707/3 |
| 2005/0114318 A1* | 5/2005 | Dettinger et al. .............. 707/3 |
| 2005/0240577 A1* | 10/2005 | Larson et al. ................. 707/3 |

* cited by examiner

*Primary Examiner*—Don Wong
*Assistant Examiner*—Patrick A. Darno
(74) *Attorney, Agent, or Firm*—Patterson & Sheridan

(57) ABSTRACT

A method, system and article of manufacture for processing aggregation queries that are executed against a database and, more particularly, for managing aggregation data structures associated with tables of a database. One embodiment provides a method for managing creation of aggregation data structures for tables of a database. The method comprises receiving an aggregation query specifying at least one aggregation operation on data of a table of the database, determining aggregation information for the aggregation query, the aggregation information describing aspects of the aggregation query and its respective aggregation operation, determining whether the aggregation information satisfies predefined conditions, and, if the predefined conditions are satisfied by the aggregation information, creating an aggregation data structure for the table of the database in a manner allowing return of aggregation data of the created aggregation data structure upon receipt of a suitable aggregation query without executing the suitable aggregation query against the table of the database, wherein the suitable aggregation query includes the aggregation operation contained in the aggregation query for which the aggregation data structure was created.

11 Claims, 5 Drawing Sheets

FIG. 5

| QUERY ID | COLUMN | AGGREGATION OPERATION | QUERY TEXT | USER | TIMESTAMP | QUERY ATTRIBUTES | SAVINGS |
|---|---|---|---|---|---|---|---|
| 1 | * | COUNT | ... | SANTO | 01/01/04 | ... | 5ms |
| 1 | SALARY | SUM | ... | SANTO | 01/01/04 | ... | 22ms |
| 1 | SALARY | AVG | ... | SANTO | 01/01/04 | ... | 25ms |
| 1 | SALARY | MAX | ... | SANTO | 01/01/04 | ... | 17ms |
| . | . | . | . | . | . | . | . |
| . | . | . | . | . | . | . | . |
| . | . | . | . | . | . | . | . |

METHOD AND SYSTEM FOR MANAGING AGGREGATION DATA STRUCTURES

BACKGROUND OF THE INVENTION

1. Field of the Invention

The present invention generally relates to processing aggregation queries that are executed against a database and, more particularly, to managing aggregation data structures associated with tables of a database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

One function supported by query languages, including SQL, is the determination of summary information. Summary information is aggregated data that is related to information being stored and managed by the DBMS. In SQL, summary information may be retrieved using aggregation functions and a GROUP BY clause on SELECT operations. For instance, assume a user who wants to obtain summary information that describes an average salary of employees working in each of the various departments of a company. To this end, the user may issue the following SQL aggregation query against a corresponding database to obtain the summary information:

SELECT department_number, AVG(salary)
FROM employees_table
GROUP BY department_number Accordingly, a table "employees_table" containing information related to all employees of the company is retrieved from the corresponding database. Salaries of all employees working in the company are retrieved from a "salary" column of the "employees_table". The salaries are grouped with respect to different departments in which corresponding employees are working. Each department is uniquely identified by its "department_number". For each department of the company, an averaging aggregation operation "AVG" is performed on all salaries of employees working in the department. As the query result, all average salaries of the different departments of the company are returned to the user.

One difficulty when dealing with aggregation queries is that aggregate values, such as the average salary in the example above, are only determined when respective aggregation queries are issued against databases. However, queries and, consequently, query workload can consume significant system resources, particularly processor resources. The system resources consumption of a query against one or more databases depends on the complexity of the query and the searched database(s). Resource consumption increases where a multitude of different aggregation queries requests identical aggregate values from a large table of a database, since the aggregate value must be re-determined each time one of the different aggregation queries is executed. One technique which has been employed to deal with this difficulty is to create and maintain aggregation data structures. Aggregation data structures contain data returned for aggregation operations of previous queries. Subsequent aggregation queries containing a given aggregation operation can then be executed against the aggregation data structures created for the given aggregation operation, instead of against the base table in the database.

Aggregation data structures are persistently stored and managed by a database administrator. However, maintaining multiple aggregation data structures for the corresponding table(s) may require a large amount of system resources, including a significant amount of time required from the database administrator to manage the stored aggregation data structures. For example, as changes to the corresponding table(s) of the database occur the aggregation data structures must be updated in order to ensure that the correct/updated data is returned in response to subsequent queries.

Therefore, there is a need for an efficient technique for managing aggregation data structures associated with tables of a database.

SUMMARY OF THE INVENTION

The present invention is generally directed to a method, system and article of manufacture for processing aggregation queries that are executed against a database and, more particularly, for managing aggregation data structures associated with tables of a database.

One embodiment provides a method for managing creation of aggregation data structures for tables of a database. The method comprises receiving an aggregation query specifying at least one aggregation operation on data of a table of the database, determining aggregation information for the aggregation query, the aggregation information describing aspects of the aggregation query and its respective aggregation operation, determining whether the aggregation information satisfies predefined conditions, and, if the predefined conditions are satisfied by the aggregation information, creating an aggregation data structure for the table of the database in a manner allowing return of aggregation data of the created aggregation data structure upon receipt of a suitable aggregation query without executing the suitable aggregation query against the table of the database, wherein the suitable aggregation query includes the aggregation operation contained in the aggregation query for which the aggregation data structure was created.

Another embodiment provides a method for managing aggregation data structures for tables of a database. The method comprises retrieving an aggregation data structure for a table of the database, the aggregation data structure being configured to allow return of aggregation data of the aggregation data structure upon receipt of an aggregation query including an aggregation operation without executing the aggregation query against the table of the database, determining an estimated savings achieved by executing the aggregation query against the aggregation data structure, as opposed to the table, determining a maintenance cost to maintain the aggregation data structure, comparing the estimated savings to the maintenance cost, and deleting the aggregation data structure if the maintenance cost exceeds the estimated savings.

Still another embodiment provides a computer-readable medium containing a program which, when executed by a processor, performs a process for managing creation of aggregation data structures for tables of a database. The process comprises receiving an aggregation query specifying at least one aggregation operation on data of a table of the database, determining aggregation information for the aggregation query, the aggregation information describing aspects of the aggregation query and its respective aggregation operation, determining whether the aggregation information satisfies predefined conditions, and, if the predefined conditions are satisfied by the aggregation information, creating an aggregation data structure for the table of the database in a manner allowing return of aggregation data of the created aggregation data structure upon receipt of a suitable aggregation query without executing the suitable aggregation query against the table of the database, wherein the suitable aggregation query includes the aggregation operation contained in the aggregation query for which the aggregation data structure was created.

Still another embodiment provides a computer-readable medium containing a program which, when executed by a processor, performs a process for managing aggregation data structures for tables of a database. The process comprises retrieving an aggregation data structure for a table of the database, the aggregation data structure being configured to allow return of aggregation data of the aggregation data structure upon receipt of an aggregation query including an aggregation operation without executing the aggregation query against the table of the database, determining an estimated savings achieved by executing the aggregation query against the aggregation data structure, as opposed to the table, determining a maintenance cost to maintain the aggregation data structure, comparing the estimated savings to the maintenance cost, and deleting the aggregation data structure if the maintenance cost exceeds the estimated savings.

Yet another embodiment provides a data processing system comprising a database, and a query execution manager residing in memory for managing creation of aggregation data structures for tables of the database. The query execution manager is configured for receiving an aggregation query specifying at least one aggregation operation on data of a table of the database, determining aggregation information for the aggregation query, the aggregation information describing aspects of the aggregation query and its respective aggregation operation, determining whether the aggregation information satisfies predefined conditions, and, if the predefined conditions are satisfied by the aggregation information, creating an aggregation data structure for the table of the database in a manner allowing return of aggregation data of the created aggregation data structure upon receipt of a suitable aggregation query without executing the suitable aggregation query against the table of the database, wherein the suitable aggregation query includes the aggregation operation contained in the aggregation query for which the aggregation data structure was created.

Yet another embodiment provides a data processing system comprising a database, and a query execution manager residing in memory for managing aggregation data structures for tables of the database. The query execution manager is configured for retrieving an aggregation data structure for a table of the database, the aggregation data structure being configured to allow return of aggregation data of the aggregation data structure upon receipt of an aggregation query including an aggregation operation without executing the aggregation query against the table of the database, determining an estimated savings achieved by executing the aggregation query against the aggregation data structure, as opposed to the table, determining a maintenance cost to maintain the aggregation data structure, comparing the estimated savings to the maintenance cost, and deleting the aggregation data structure if the maintenance cost exceeds the estimated savings.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is an illustration of an aggregation information table in one embodiment.

DETAILED DESCRIPTION OF THE PREFERRED EMBODIMENTS

Introduction

Figure 1:
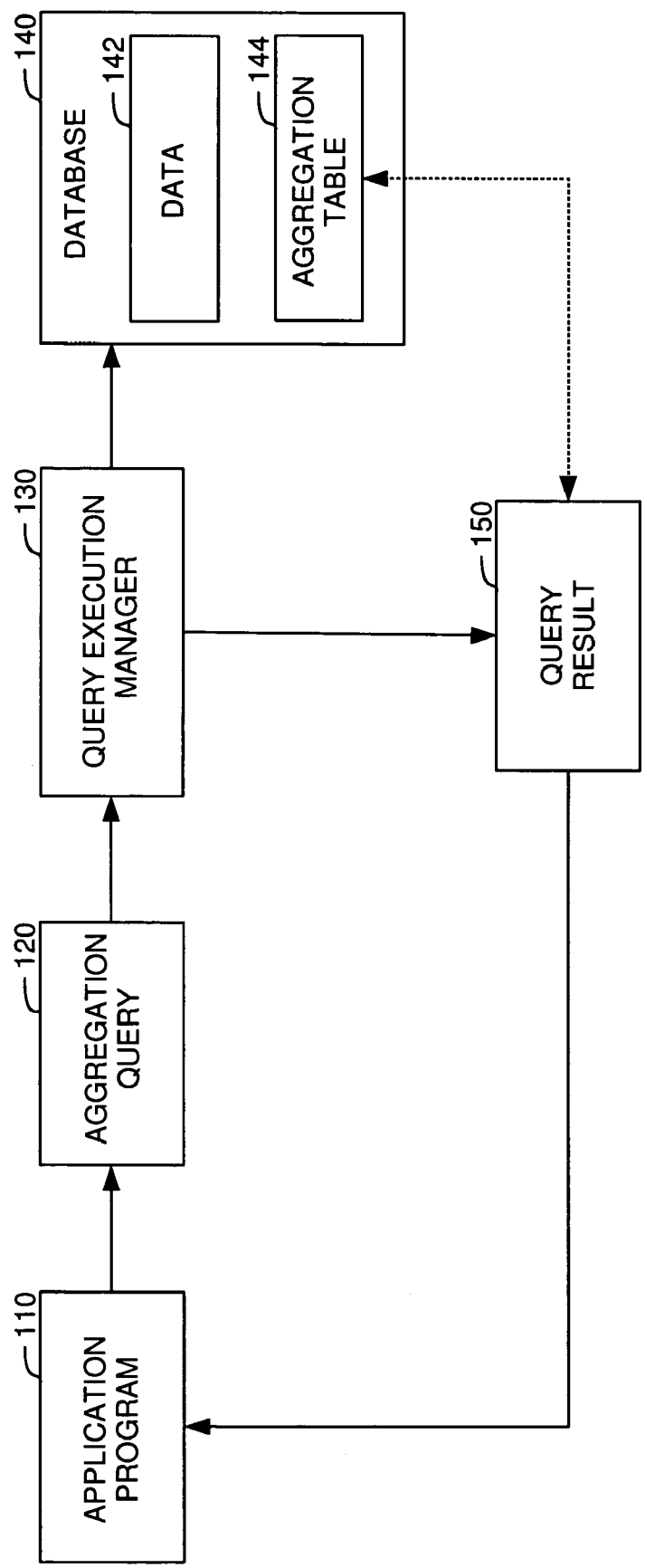
FIG. 1 is a relational view of software components in one embodiment.

The present invention is generally directed to processing queries that are executed against a database and, more particularly, to processing aggregation queries that are executed against a database. Aspects of the present invention are directed to managing aggregation data structures associated with tables of a database.

Aggregation queries are executed against a database to obtain aggregation data (i.e., summary information) related to data in the database. An aggregation query includes at least one result field having an associated aggregation operation to be executed on a table of the database to determine the aggregation data. An aggregation data structure allows return of aggregation data of the aggregation data structure upon receipt of a suitable aggregation query if the suitable aggregation query includes an aggregation operation identical to the associated aggregation operation contained in the aggregation query for which the aggregation data structure was created. Returning the aggregation data of the aggregation data structure allows execution of the suitable aggregation query against the table of the database to be avoided.

According to one aspect, creation of an aggregation data structure for a table of a database is managed. To this end, aggregation information is determined for each aggregation query which is issued against the table. The aggregation information describes aspects of each aggregation query and its respective aggregation operation(s). If the aggregation information satisfies predefined conditions, an aggregation data structure is created for the table of the database.

According to another aspect, existing aggregation data structures for a table of the database are managed. To this end, a determination is made of an estimated savings achieved by executing a given aggregation query against an aggregation data structure, as opposed to executing the given aggregation query against the table of the database. Furthermore, a maintenance cost is determined which describes a cost that is required to maintain the aggregation data structure. The estimated savings is compared to the maintenance cost. If the maintenance cost exceeds the estimated savings, the aggregation data structure is deleted.

Data Processing Environment

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

PREFERRED EMBODIMENTS

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a relational view of software components in one embodiment is illustrated. The software components include one or more applications 110 (only one application program is illustrated for simplicity) and a query execution manager 130.

According to one aspect, the application 110 (and more generally, any requesting entity including, at the highest level, users) issues queries, such as aggregation query 120, against data 142 in a database 140. The aggregation queries issued by the application 110 may be predefined (i.e., hard coded as part of the application 110) or may be generated in response to input (e.g., user input). The database 140 is representative of any collection of data regardless of the particular physical representation. By way of illustration, the database 140 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive): or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In one embodiment, the query execution manager 130 is configured to manage execution of aggregation queries (e.g., aggregation query 120) against the database 140. The query execution manager 130 is further configured to manage aggregation data structures (e.g., the aggregation table 144) for the database 140. More specifically, the query execution manager 130 is configured to perform an intelligent and selective creation and cleanup management of aggregation data structures upon analysis of received aggregation queries and aspects relating to aggregation data structures. Operation of the query execution manager 130 for managing creation and cleanup of aggregation data structures is explained in more detail below with reference to FIGS. 2-5.

One embodiment of a method 200 for managing execution of an aggregation query (e.g., aggregation query 120 of FIG. 1) against data of a database (e.g., data 142 of database 140 of FIG. 1) is explained with reference to FIG. 2. The aggregation query is issued by an issuing entity (e.g., application 110 of FIG. 1). The method 200 can be performed by a query execution manager (e.g., query execution manager 130 of FIG. 1). Method 200 starts at step 210.

At step 220, the aggregation query is received. In one embodiment, the aggregation query requests aggregation data with respect to a table of the database, such as the exemplary database table "company_XYZ" shown in Table I below.

TABLE I

EXEMPLARY DATABASE TABLE "COMPANY_XYZ"

| 001 | department_number | employee_ID | salary | last_raise |
|---|---|---|---|---|
| 002 | 0 | 1 | 40.000 | 1.000 |
| 003 | 0 | 2 | 40.000 | 1.000 |
| 004 | 0 | 3 | 40.000 | 1.000 |
| 005 | 0 | 4 | 60.000 | 1.000 |
| 006 | 0 | 5 | 20.000 | 1.000 |
| 007 | 0 | 6 | 20.000 | 1.000 |
| 008 | 0 | 7 | 30.000 | 1.000 |
| 009 | 0 | 8 | 70.000 | 1.000 |
| 010 | 1 | 14 | 60.000 | 2.000 |
| 011 | 1 | 15 | 60.000 | 2.000 |
| 012 | 1 | 16 | 60.000 | 2.000 |
| 013 | 1 | 17 | 16.000 | 2.000 |
| 014 | 1 | 18 | 16.000 | 2.000 |
| 015 | 1 | 19 | 20.000 | 2.000 |
| 016 | 2 | 9 | 20.000 | 2.000 |
| 017 | 2 | 10 | 50.000 | 2.000 |
| 018 | 2 | 11 | 50.000 | 2.000 |
| 019 | 3 | 12 | 50.000 | 2.000 |
| 020 | 3 | 13 | 30.000 | 2.000 |

As can be seen from Table I, the "company_XYZ" table illustratively contains and identification of corresponding departments (department_number), unique employee identifications (employee_ID), respective salaries (salary) and amounts of a last salary raise (last_raise) for each employee working in the company "company_XYZ".

Table II shows an exemplary aggregation query which is executed against the table shown in Table I. By way of illustration, the exemplary aggregation query is defined using SQL. However, any other language may be used to advantage.

TABLE II

EXEMPLARY SQL AGGREGATION QUERY

| 001 | SELECT |
| 002 | department_number, COUNT(*), SUM(salary), AVG(salary), MAX(salary) |
| 003 | FROM |
| 004 | company_XYZ |
| 005 | GROUP BY |
| 006 | department_number |

As can be seen from line 003 of Table II, the exemplary SQL aggregation query includes a FROM statement having a FROM clause element (line 004). The FROM clause element indicates that the database table "company_XYZ" (Table I) is queried by the exemplary SQL aggregation query. The exemplary SQL aggregation query of Table II further includes a SELECT statement (line 001) having a SELECT clause element (line 002). The SELECT clause element determines result fields to be returned upon execution of the exemplary SQL aggregation query. Specifically, the SELECT clause element can be used to associate columns of the "company_XYZ" table with respective aggregation operations. By way of example, the SELECT clause element "AVG(salary)" shown in line 002 associates the "salary" column with an averaging function to determine average values on the "salary" column of the "company_XYZ" table. More specifically, as can be seen from line 002, the exemplary SQL aggregation query includes four aggregation operations: COUNT, SUM, AVG and MAX. The exemplary SQL aggregation query of Table II further includes a GROUP BY statement (line 005) having a GROUP BY clause element (line 006). In this example, the GROUP BY clause element has been created for the "department_number" column. Accordingly, the aggregation operations are determined separately for each department identified by its "department_number".

In the following, the remaining steps of method 200 will be explained in more detail with reference to the exemplary SQL aggregation query of Table II (hereinafter referred to as the aggregation query) and the exemplary database table "company_XYZ" of Table I (hereinafter referred to as the "company_XYZ" table) by way of example. At step 230, aggregation information is determined for the aggregation query. The aggregation information describes aspects of the aggregation query and its respective aggregation operation(s). The aggregation information is suitable for determining whether to create an aggregation data structure for the "company_XYZ" table, if such an aggregation data structure does not already exist. The aggregation data structure allows aggregation data of the aggregation data structure to be returned upon receipt of a subsequent aggregation query if the subsequent aggregation query includes an aggregation operation similar to the aggregation operation contained in the aggregation query for which the aggregation data structure was created. Accordingly, execution of the subsequent aggregation query against the "company_XYZ" table of the database can be avoided, in favor of the more expedient execution against the aggregation data structure.

At step 240 the aggregation information is stored. In one embodiment, the aggregation information is persistently stored in an aggregation information data structure, such as an aggregation information table (e.g., aggregation information table 500 of FIG. 5). However, it should be noted that the invention is not limited to storing the aggregation information in a database table. Instead, any suitable form for storing aggregation information is contemplated. Furthermore, the invention is not limited to storing the aggregation information in one database table. Instead, the aggregation information can be stored in plural database tables which may, for instance, be implemented according to a relational database schema.

Referring now to FIG. 5, an exemplary aggregation information table 500 is illustrated. Illustratively, the exemplary aggregation information table 500 includes aggregation information that is determined for the aggregation query of Table II.

The exemplary aggregation information table 500 contains a plurality of rows 510-516. Each row of the exemplary aggregation information table 500 describes an aggregation operation of the aggregation query that is associated with a corresponding column of the "company_XYZ" table, on which the aggregation operation is performed. For instance, row 514 indicates that the aggregation operation "AVG" is performed on the "salary" column of the "company_XYZ" table.

The exemplary aggregation information table 500 further contains a plurality of columns 522-538. Column 522 "QUERY ID" associates a unique query identifier with the aggregation query of Table II. Illustratively, the aggregation query has been associated with the unique query identifier "1". Column 524 "COLUMN" contains information about each column of the "company_XYZ" table, on which an aggregation operation is performed. As can be seen from line 002 of Table II above, aggregation operations are performed on the "salary" column. Column 526 contains the aggregation operation(s) included in the aggregation query, i.e., COUNT, SUM, AVG and MAX. Note that, for a given query, a table record exists for each aggregation operation. Column 528 contains the query text of the aggregation query which is uniquely identified by the query identifier in column 522. In the given example, all rows 510-516 would contain the query text of the aggregation query as illustrated in Table II above. However, for simplicity the query text of the aggregation query has been omitted in the exemplary aggregation information table 500. Column 532 contains an identification of the user who issued the aggregation query. By way of example, the identification can be a user name or a user identifier. Column 534 contains a timestamp of the point of time when the aggregation query is executed. Column 536 contains information about query attributes describing attributes of the query and/or the computing environment at the point of time when the aggregation query is executed. In one embodiment, the query attributes describe parameters related to an execution of the aggregation query. Illustrative query attributes contained in column 536 may include parameters indicating a character code set within which the aggregation query is to be executed, such as ASCII or UNICODE. Other query attributes may indicate a processing time-out limit specifying that processing of the aggregation query should be terminated if it is not completed within a given time frame. Still other query attributes may indicate that the aggregation query should be run a predefined number of times, such as only once, weekly or monthly. Still other query attributes may indicate, if the aggregation query is to be executed in a multi-processor environment, whether the aggregation query should be executed simultaneously on multiple processors. Any of the information contained in column 536 may be used to determine whether corresponding aggregation data produced by the aggregation query should be saved in an aggregation data structure. Column 538 contains information about an estimated savings achieved by executing the corresponding aggregation operation of column 526 against the aggregation data structure, as opposed to executing the aggregation operation against the "company_XYZ" table. Illustratively, row 514 indicates that a time period of "25 ms" could be saved if the "AVG" aggregation operation is executed against the aggregation data structure instead of against the "company_XYZ" table. It should be noted that a quantity of time is only one example for a possible savings estimation. More generally, any other suitable quantity to accurately describe the savings is also contemplated such as, for instance, a number of central processing unit cycles.

Figure 2:
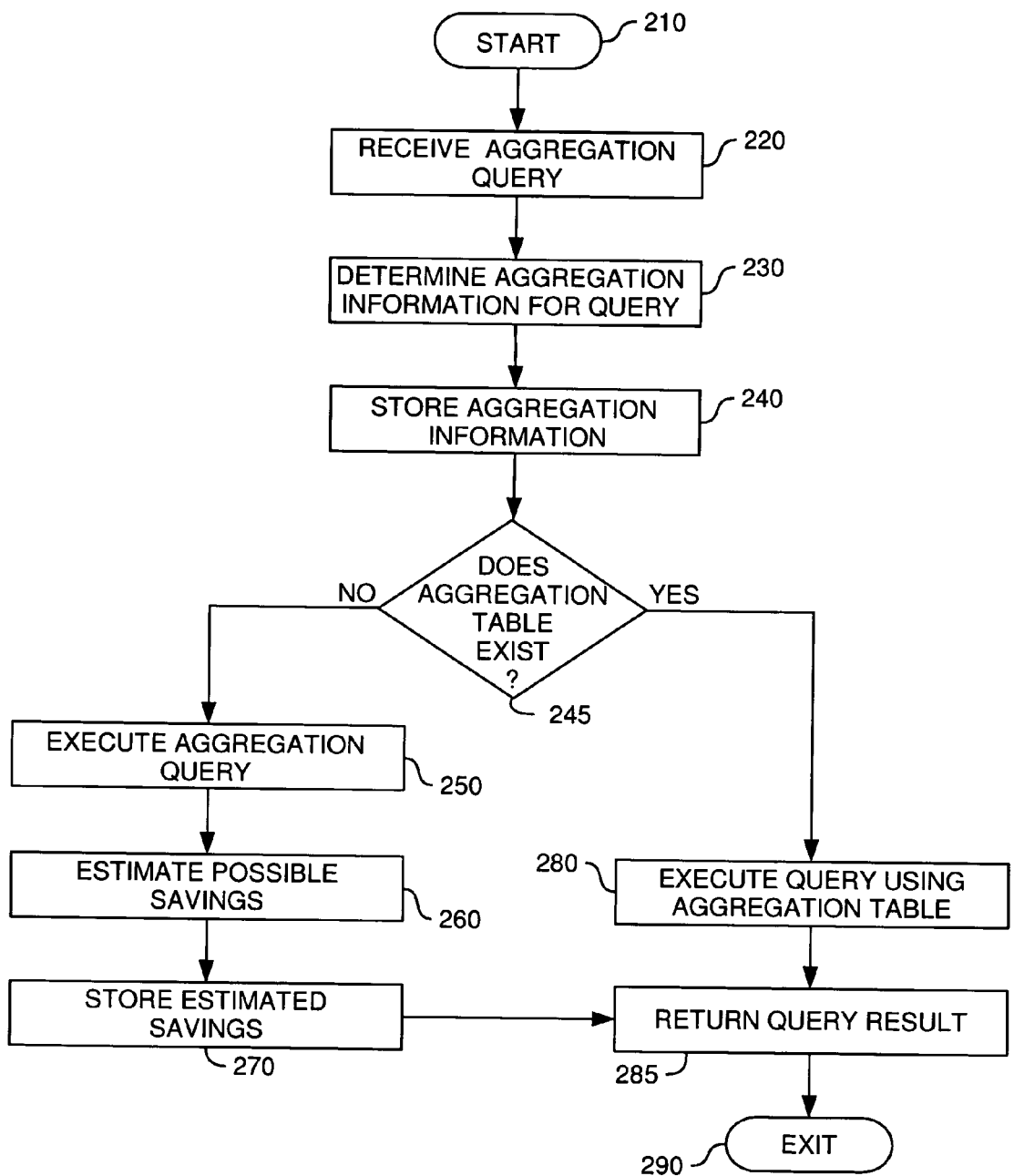
FIG. 2 is a flow chart illustrating a method for managing aggregation query execution in one embodiment.

Referring now back to FIG. 2, at step 245 it is determined whether an aggregation data structure (e.g., aggregation table 144 of FIG. 1) having the requested aggregation data exists. If such an aggregation data structure exists, the aggregation query is executed (at step 280) against the aggregation data structure, as opposed to an execution against the "company_XYZ" table. Processing then continues at step 285 as described below. It should be noted that determining whether a corresponding aggregation data structure exists and executing the aggregation query against such an aggregation data structure is well-known in the art and is, therefore, not described in more detail.

If, however, it is determined at step 245 that no corresponding aggregation data structure exists, the aggregation query is executed against the "company_XYZ" table at step 250. At step 260, a savings is estimated that could be achieved by executing subsequent instances of the aggregation query using an aggregation data structure, as opposed to using the "company_XYZ" table. The estimation can be conveniently calculated using the information made available by the execution performed at step 250. At step 270 the estimated savings is stored in the aggregation information table (e.g., in column 538 of the aggregation information table 500 of FIG. 5). Subsequently, a corresponding query result (e.g., query result 150 of FIG. 1) is returned to the issuing entity at step 285. The query result that is returned to the issuing entity in the given example is illustrated in Table III below.

TABLE III

EXEMPLARY AGGREGATION QUERY RESULT

| department_number | COUNT(*) | SUM(salary) | AVG(salary) | MAX (salary) |
|---|---|---|---|---|
| 0 | 8 | 320.000 | 40.000 | 70.000 |
| 1 | 6 | 232.000 | 38.666, 67 | 60.000 |
| 2 | 3 | 120.000 | 40.000 | 50.000 |
| 3 | 2 | 80.000 | 40.000 | 50.000 |

According to lines 005-006 of the aggregation query of Table II, the query result is grouped by "department_number". Accordingly, the query result only contains four rows, one for each department_number. According to line 002 of the aggregation query of Table II, five columns are displayed in Table III: a "department_number", a "COUNT(*)", a "SUM(salary)", an "AVG(salary)" and a "MAX(salary)" column. The "COUNT(*)" column contains a total number of employees per department, the "SUM(salary)" column contains a sum of all salaries per department, the "AVG (salary)" column contains an average value of all salaries per department and the "MAX(salary)" column contains a maximal value of all salaries per department. Method 200 then exits at step 290.

Figure 3:
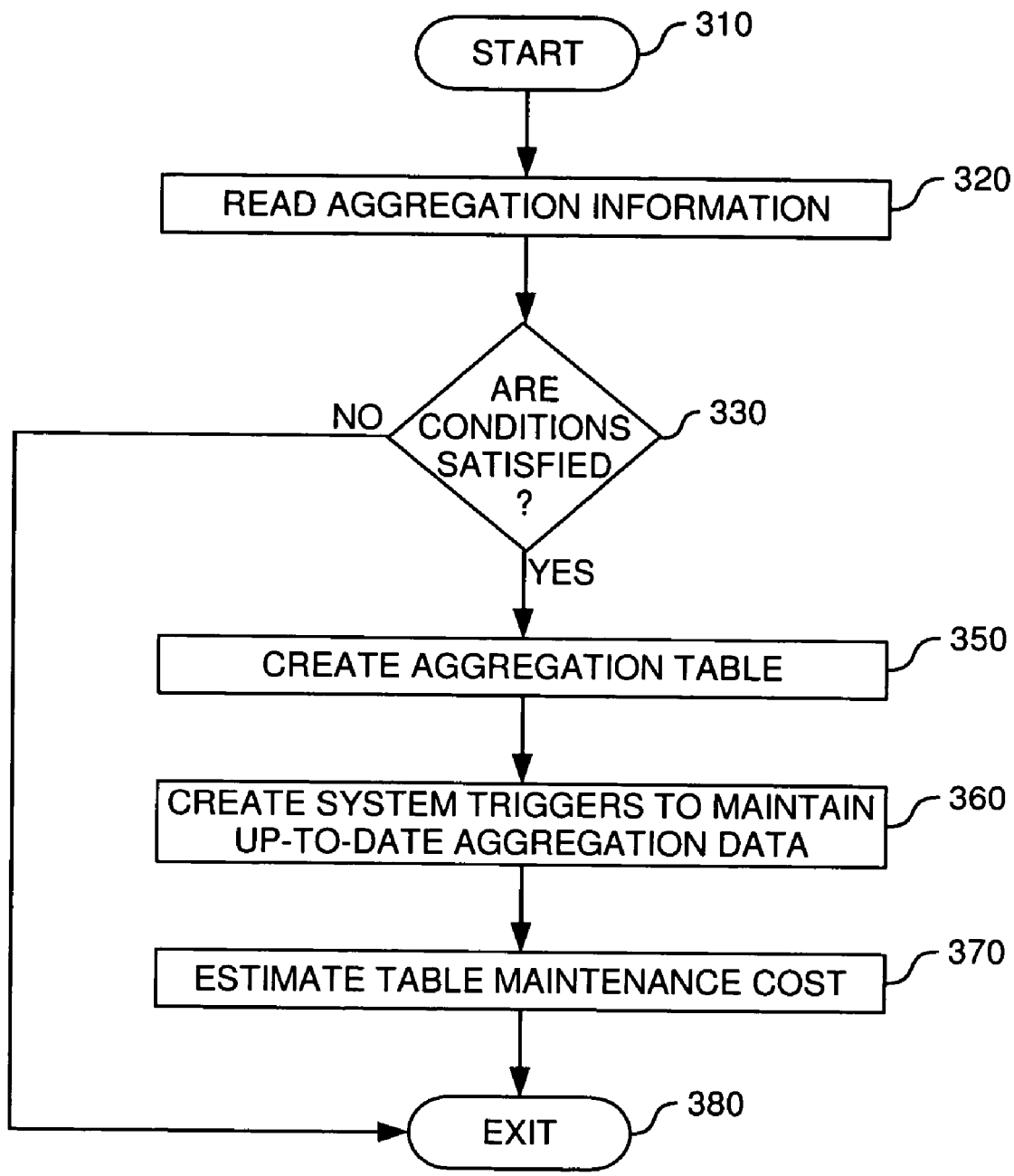
FIG. 3 is a flow chart illustrating a method for managing creation of an aggregation data structure in one embodiment.

Referring now to FIG. 3, one embodiment of a method 300 for managing creation of aggregation data structures (e.g., aggregation table 144 of FIG. 1) for tables of a database (e.g., database 140 of FIG. 1) is illustrated. More specifically, method 300 illustrates a process for autonomically determining whether one or more aggregation data structures should be created and stored. In one embodiment, the method 300 is performed by a query execution manager (e.g., query execution manager 130 of FIG. 1). According to one aspect, the method 300 is performed on a periodic basis, such as nightly, weekly or monthly. Execution of the method 300 can be scheduled for off-hours to avoid an unnecessary increase of workload during peak hours. However, the method 300 may also be performed more frequently and/or irregularly without regard to selective times of day. For instance, the method 300 may be performed each time step 270 of FIG. 2 is performed.

The method 300 starts at step 310. At step 320 available aggregation information is retrieved. That is, the available aggregation information is read from an aggregation information table (e.g., aggregation information table 500 of FIG. 5). In one embodiment, all aggregation information from the aggregation information table is read. In another embodiment, only the most recent aggregation information is read which has been stored since a previous execution of method 300. At step 330, it is determined whether various predefined conditions are satisfied with respect to the aggregation information. Generally, the conditions define whether an aggregation data structure should be created for a given aggregation operation. For instance, a condition may be whether the estimated savings that would be achieved using the aggregation data structure as opposed to the underlying database table (determined at step 260 of FIG. 2) is significant enough to merit creation of the aggregation data structure. Another condition may be based on the particular user who submitted the query that included the given aggregation operation. For example, some users submit queries regularly and consume significant resources, while others submit queries only occasionally or even on only a single occasion. In the case of the former user type, creation and maintenance of aggregation data structures is more compelling than in the case of the latter user type. Alternatively, a frequency of occurrence of each aggregation operation on a corresponding column of the table of the database can be determined or estimated. In this case the conditions are satisfied if the frequency of occurrence exceeds a predetermined threshold. It should be noted that a variety of conditions are within the knowledge of the person skilled in the art and may be based on any indications provided by the aggregation information table, such as the query attributes, for instance.

If the conditions are not satisfied, method 300 exits at step 380. If, however, the conditions are satisfied, the aggregation data structure is created at step 350. Furthermore, at step 360 triggers are created on the table of the database for updating the aggregation data structure when relevant data of the database changes. Thus, an up-to-date aggregation data structure can be maintained in memory.

At step 370, a maintenance cost is determined for the aggregation data structure. The maintenance cost describes, for example, how much time or central processing unit cycles are required to maintain the aggregation data structure. For instance, the maintenance cost may consider how many SELECT, UPDATE, INSERT, DELETE statements or the like are performed against the aggregation data structure. Method 300 then exits at step 380.

Figure 4:
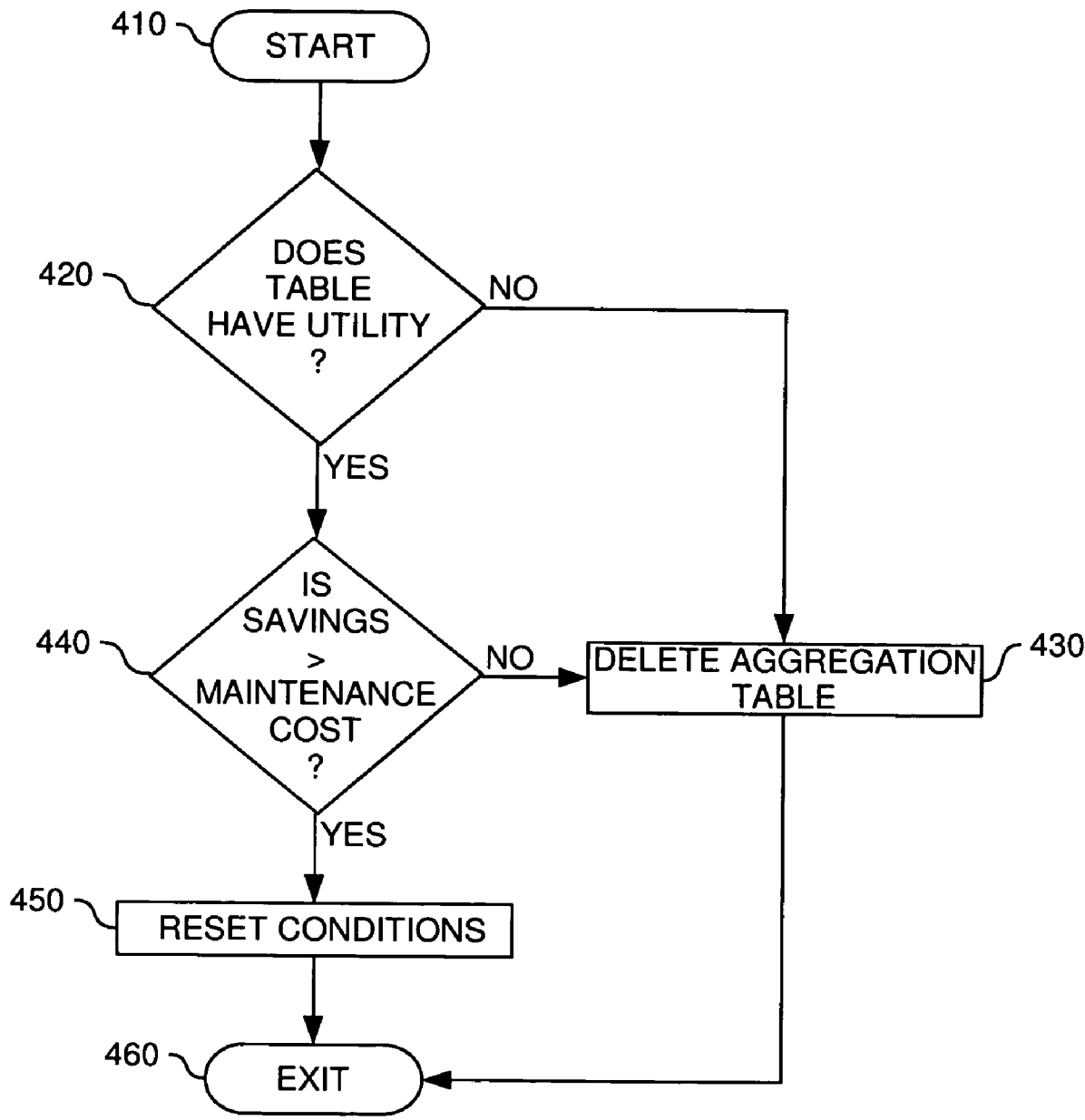
FIG. 4 is a flow chart illustrating a method for managing aggregation data structures in one embodiment.

Referring now to FIG. 4, one embodiment of a method 400 for managing aggregation data structures (e.g., aggregation table 144 of FIG. 1) for tables of a database (e.g., database 140 of FIG. 1) is illustrated. Specifically, method 400 illustrates a cleanup process for autonomically determining whether existing aggregation data structures should be maintained in memory or deleted therefrom. In one embodiment, the method 400 is performed by a query execution manager (e.g., query execution manager 130 of FIG. 1). According to one aspect, the method 400 is performed on a periodic basis, such as weekly or monthly. Execution of the method 400 can be performed during off-hours to avoid an unnecessary increase of workload during peak hours. However, the method 400 may also be performed more frequently and/or irregularly without regard to system usage. The method 400 can be performed each time method 300 of FIG. 3 has been performed or independently of when method 300 is performed.

The method 400 starts at step 410. At step 420 it is determined whether the aggregation data structure has any utility. That is, a determination is made as to whether the aggregation data structure is being sufficiently used. To this end, in one embodiment, it is determined whether the aggregation data structure has been accessed in a given period of time. In another embodiment, it may be determined whether the aggregation data structure has been accessed at least a given number of times in the given period of time. Other determinations of whether the aggregation data structure has any utility are considered to be within the knowledge of the person skilled in the art and are also contemplated.

If it is determined that the aggregation data structure has no utility, it is deleted at step 430. Method 400 then exits at step 460. If, however, it is determined that the aggregation data structure has any utility, it is determined whether estimated savings achieved by using the aggregation data structure exceeds a maintenance cost required for maintaining the aggregation data structure. If the maintenance cost exceeds the estimated savings, the aggregation data structure is deleted at step 430. If, however, the maintenance cost does not exceed the estimated savings, it is assumed that there is merit to maintain the aggregation data structure in memory. Accordingly, the aggregation data structure is not deleted. Then, at step 450, any conditions which have been used to decide whether the aggregation data structure should be maintained or deleted are removed. For instance, all determined values such as estimated savings or maintenance costs determined for the previous cycle of method 400 are removed. This ensures that each iteration of method 400 is performed on the basis of current savings and maintenance values. Method 400 then exits at step 460.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A method for managing creation of aggregation data structures for tables of a database, comprising:
   receiving an aggregation query specifying at least one aggregation operation on data of a table of the database;
   determining aggregation information for the aggregation query, the aggregation information describing aspects of the aggregation query and its respective aggregation operation;
   determining an estimated savings achieved by executing the aggregation query against the aggregation data structure, as opposed to executing the aggregation query against the table of the database:
   estimating a maintenance cost for the aggregation data structure;
   comparing the maintenance cost with the estimated savings;
   only if the maintenance cost does not exceed the estimated savings, creating an aggregation data structure for the table of the database in a manner allowing return of aggregation data of the created aggregation data structure upon receipt of a suitable aggregation query without executing the suitable aggregation query against the table of the database, wherein the suitable aggregation query includes the aggregation operation contained in the aggregation query for which the aggregation data structure was created; and if the maintenance cost exceeds the estimated savings, executing the suitable aggregation query against the table of the database.

2. The method of claim 1, wherein the suitable aggregation query is an SQL query and each aggregation operation is one of a COUNT, AVERAGE, MIN and MAX function.

3. The method of claim 1, further comprising:
determining a frequency of occurrence of each aggregation operation on a corresponding column of the table of the database; and
comparing the frequency of occurrence with a predetermined threshold.

4. The method of claim 1, wherein the estimated savings is at least one of an amount of time and a number of central processing unit cycles saved by executing the aggregation operations against the aggregation data structure.

5. The method of claim 1, further comprising:
creating triggers on the table of the database for updating the aggregation data structure when relevant data of the database changes.

6. A computer-readable storage medium storing a program which, when executed by a processor, performs a process for managing creation of aggregation data structures for tables of a database, the process comprising:
receiving an aggregation query specifying at least one aggregation operation on data of a table of the database;
determining aggregation information for the aggregation query, the aggregation information describing aspects of the aggregation query and its respective aggregation operation;
determining an estimated savings achieved by executing the aggregation query against the aggregation data structure, as opposed to executing the aggregation query against the table of the database;
estimating a maintenance cost for the aggregation data structure;
comparing the maintenance cost with the estimated savings;
only if the maintenance cost does not exceed the estimated savings, creating an aggregation data structure for the table of the database in a manner allowing return of aggregation data of the created aggregation data structure upon receipt of a suitable aggregation query without executing the suitable aggregation query against the table of the database, wherein the suitable aggregation query includes the aggregation operation contained in the aggregation query for which the aggregation data structure was created; and
if the maintenance cost exceeds the estimated savings, executing the suitable aggregation query against the table of the database.

7. The computer-readable storage medium of claim 6, wherein the suitable aggregation query is an SQL query and each aggregation operation is one of a COUNT, AVERAGE, MIN and MAX function.

8. The computer-readable storage medium of claim 6, wherein the process further comprises:
determining a frequency of occurrence of each aggregation operation on a corresponding column of the table of the database; and
comparing the frequency of occurrence with a predetermined threshold.

9. The computer-readable storage medium of claim 6, wherein the estimated savings is at least one of an amount of time and a number of central processing unit cycles saved by executing the aggregation operations against the aggregation data structure.

10. The computer-readable storage medium of claim 6, wherein the process further comprises:
creating triggers on the table of the database for updating the aggregation data structure when relevant data of the database changes.

11. A data processing system, comprising:
a database; and
a query execution manager residing in memory for managing creation of aggregation data structures for tables of the database, the query execution manager being configured for:
receiving an aggregation query specifying at least one aggregation operation on data of a table of the database;
determining aggregation information for the aggregation query, the aggregation information describing aspects of the aggregation query and its respective aggregation operation;
determining an estimated savings achieved by executing the aggregation query against the aggregation data structure, as opposed to executing the aggregation query against the table of the database;
estimating a maintenance cost for the aggregation data structure;
comparing the maintenance cost with the estimated savings;
only if the maintenance cost does not exceed the estimated savings, creating an aggregation data structure for the table of the database in a manner allowing return of aggregation data of the created aggregation data structure upon receipt of a suitable aggregation query without executing the suitable aggregation query against the table of the database, wherein the suitable aggregation query includes the aggregation operation contained in the aggregation query for which the aggregation data structure was created; and
if the maintenance cost exceeds the estimated savings, executing the suitable aggregation query against the table of the database.

* * * * *